(12) United States Patent
Boutnaru

(10) Patent No.: US 10,805,345 B2
(45) Date of Patent: Oct. 13, 2020

(54) BLIND INJECTION ATTACK MITIGATION

(71) Applicant: PayPal, Inc., San Jose, CA (US)

(72) Inventor: Shlomi Boutnaru, Modiin (IL)

(73) Assignee: PAYPAL, INC., San Jose, CA (US)

( * ) Notice: Subject to any disclaimer, the term of this patent is extended or adjusted under 35 U.S.C. 154(b) by 154 days.

(21) Appl. No.: 15/721,383

(22) Filed: Sep. 29, 2017

(65) Prior Publication Data
US 2019/0104152 A1    Apr. 4, 2019

(51) Int. Cl.
| | |
|---|---|
| *H04L 29/06* | (2006.01) |
| *G06F 16/2455* | (2019.01) |
| *H04L 9/00* | (2006.01) |
| *G06F 21/55* | (2013.01) |
| *G06F 7/58* | (2006.01) |

(52) U.S. Cl.
CPC .... *H04L 63/1466* (2013.01); *G06F 16/24553* (2019.01); *G06F 16/24564* (2019.01); *G06F 21/554* (2013.01); *H04L 9/004* (2013.01); *G06F 7/588* (2013.01)

(58) Field of Classification Search
CPC . H04L 63/1466; G06F 16/24564; G06F 7/588
See application file for complete search history.

(56) References Cited

U.S. PATENT DOCUMENTS

| | | | | | |
|---|---|---|---|---|---|
| 5,586,177 | A | * | 12/1996 | Farris | H04Q 3/0029 370/426 |
| 5,592,477 | A | * | 1/1997 | Farris | H04L 49/255 370/396 |
| 5,745,386 | A | * | 4/1998 | Wile | G01R 31/31704 703/15 |
| 5,890,150 | A | * | 3/1999 | Ushijima | G06F 16/2462 707/714 |
| 6,275,476 | B1 | * | 8/2001 | Wood, Jr. | G06K 7/0008 370/312 |
| 8,087,092 | B2 | * | 12/2011 | Richardson | G06F 21/86 713/187 |

(Continued)

OTHER PUBLICATIONS

Mishra et al., Defenses to Protect Against SQL Injection Attacks, IJARCCE, 2013.*

(Continued)

*Primary Examiner* — David Garcia Cervetti
(74) *Attorney, Agent, or Firm* — Haynes and Boone, LLP

(57) ABSTRACT

Blind injection attacks can compromise computer systems and their data. These attacks can appear in SQL, XML, LDAP, OS commands, or other contexts. Blind injection attacks may be used to obtain information from a data source based on whether a response is returned within a certain time frame. By introducing intentional delay servicing of commands, however, the efficacy of blind injection attacks can be reduced. SQL query statements or other commands can be analyzed to determine if a conditional delay exists, and randomization effects can be used (sometimes based on length of the conditional delay) to make it difficult for an attacker to use blind injection. These techniques may broadly apply to any data source, and include databases exposed to the public via the internet (e.g. via a web server URL). Blind SQL injection, blind XML injection, and other blind injection attacks can be mitigated using techniques described herein.

20 Claims, 4 Drawing Sheets

(56) References Cited

U.S. PATENT DOCUMENTS

| | | | | |
|---|---|---|---|---|
| 8,886,803 | B1* | 11/2014 | Kandekar | H04L 69/28 709/201 |
| 9,369,538 | B2* | 6/2016 | Faccin | H04L 67/2819 |
| 9,471,777 | B1* | 10/2016 | Juels | H04N 9/002 |
| 9,736,130 | B1* | 8/2017 | Asveren | G06F 21/33 |
| 9,917,820 | B1* | 3/2018 | Kolman | G06F 16/2471 |
| 10,496,647 | B2* | 12/2019 | Brookler | G06F 16/248 |
| 2007/0150437 | A1* | 6/2007 | Dwork | G06F 21/6227 |
| 2009/0045920 | A1* | 2/2009 | McQuaide, Jr. | G06F 16/285 340/10.2 |
| 2009/0113543 | A1* | 4/2009 | Adams | H04W 12/08 726/18 |
| 2009/0260078 | A1* | 10/2009 | Nakazawa | G06F 21/31 726/19 |
| 2010/0008235 | A1* | 1/2010 | Tinnakornsrisuphap | H04L 29/12264 370/241 |
| 2010/0014519 | A1* | 1/2010 | Fernandez Gutierrez | H04L 12/185 370/390 |
| 2011/0004921 | A1* | 1/2011 | Homer | G06F 21/31 726/3 |
| 2013/0054762 | A1* | 2/2013 | Asveren | H04L 61/2553 709/220 |
| 2013/0165047 | A1* | 6/2013 | Suzuki | H04W 12/06 455/41.2 |
| 2013/0179966 | A1* | 7/2013 | Sawamura | G06F 21/31 726/19 |
| 2014/0254426 | A1* | 9/2014 | Abraham | H04W 52/0216 370/254 |
| 2015/0009824 | A1* | 1/2015 | Jeong | H04W 48/14 370/235 |
| 2015/0088844 | A1* | 3/2015 | Stigsen | G06F 16/221 707/703 |
| 2015/0163242 | A1* | 6/2015 | Laidlaw | G06N 7/023 726/22 |
| 2015/0277964 | A1* | 10/2015 | Atkins | G06F 11/3433 718/101 |
| 2015/0286805 | A1* | 10/2015 | Lin | G06F 21/6209 713/168 |
| 2016/0182973 | A1* | 6/2016 | Winograd | H04N 21/8586 725/25 |
| 2016/0253486 | A1* | 9/2016 | Sarkar | G06F 21/316 726/7 |
| 2017/0371924 | A1* | 12/2017 | Ding | G06F 16/2453 |
| 2018/0300370 | A1* | 10/2018 | Brookler | G06F 16/24549 |
| 2018/0329477 | A1* | 11/2018 | Goda | G06F 3/0635 |

OTHER PUBLICATIONS

Tajpour et al., Comparison of SQL Injection Detection and Prevention Techniques, IEEE, 2010.*

Ferruh Mavituna, Deep Blind SQL Injection, www.portcullis-security.com, 2008.*

Naghmeh Moradpoor Sheykhkanloo, SQL-IDS: Evaluation of SQLi Attack Detection and Classification Based on Machine Learning Techniques, ACM, Sep. 2015.*

Halfond et al., Detection and Prevention of SQL Injection Attacks, 2007.*

Sadar et al., Securing Web Application against SQL Injection Attack: a Review, IJRITCC, Mar. 2014.*

Singh et al., Detection and Prevention of SQL Injection Attacks on Database Using Web Services, IJETAE, Apr. 2014.*

Alonso, et al., "LDAP Injection & Blind LDAP Injection" Testing WebApps in a OpenLDAP & ADAM environment, Mar. 31, 2008.

Klein, et al., "Blind XPATH Injection A whitepaper from Watchfire" Watchfire Corporation, 2005.

"Data Exfiltration via Blind OS Command Injection" Context Information Security, https://www.contextis.com/blog/data-exfiltration-via-blind-os-command-injection, Nov. 16, 2015.

Alonso, et al., "LDAP Injection & Blink LDAP Injection in Web Applications" IINFORMATICA 64.

Unknown "Blind SQL Injection Exploitation: Using Time-Based Techniques, Articles, Algorithms, Tips, Examples and Database" Programming 4 US, http://programming4.us/Database/1338.aspx, Oct. 12, 2019.

Avireddy, et al., "Random4: An Application Specific Randomized Encryption Algorithm to prevent SQL injection" 2012 IEEE 11th International Conference on Trust, Security and Privacy in Computing and Communications, 2012, p. 1327-1333.

Cobb, Michael "Preventing blind SQL injection attacks" Search Security, http://webcache.googleusercontent.com/search?q=cache:HbAwZeoTbUMJ:searchsecurity.techtarget.com/tip/Preventing-blind-SQL-injection-attacks+&cd=3&hl=en&ct=clnk&gl=us, Jun. 2006.

Arciszewski, Scott "Preventing Timing Attacks on String Comparison with a Double HMAC Strategy" Paragon Initiative Enterprises Blog, https://paragonie.com/blog/2015/11/preventing-timing-attacks-on-string-comparison-with-double-hmac-strategy, Nov. 7, 2015.

Unknown "SQL Injection Prevention Cheat Sheet" OWASP, https://www.owasp.org/index.php/SQL_Injection_Prevention_Cheat_Sheet, Jul. 19, 2017.

Unknown "Blind OS Command Injection Attacks" The HackPot, http://thehackpot.blogspot.com/2014/05/blind-os-command-injection-attacks.html, May 25, 2014.

Derewecki, Adam "Timing-based Blind SQL Attacks" Hacker Noon, https://hackernoon.com/timing-based-blind-sql-attacks-bd276dc618dd.

Hunt, Tony "Everything you wanted to know about SQL injection (but were afraid to ask)" https://www.troyhunt.com/everything-you-wanted-to-know-about-sql/.

Alonso, et al., "LDAP Injection Techniques" Scientific Research, 2009.

Desai, Nirav "XPATH Injection Tutorial" Hacking & Tricks, https://tipstrickshack.blogspot.com/2013/11/xpath-injection-tutorial.html.

* cited by examiner

BLIND INJECTION ATTACK MITIGATION

TECHNICAL FIELD

This disclosure relates to computer system security. More particularly, this disclosure relates to enhanced techniques for mitigating blind injection attacks, in various embodiments, including blind SQL injection attacks, as well as XML, LDAP, operating system (OS) command, or other types of blind injection attacks.

DETAILED DESCRIPTION

Figure 1:
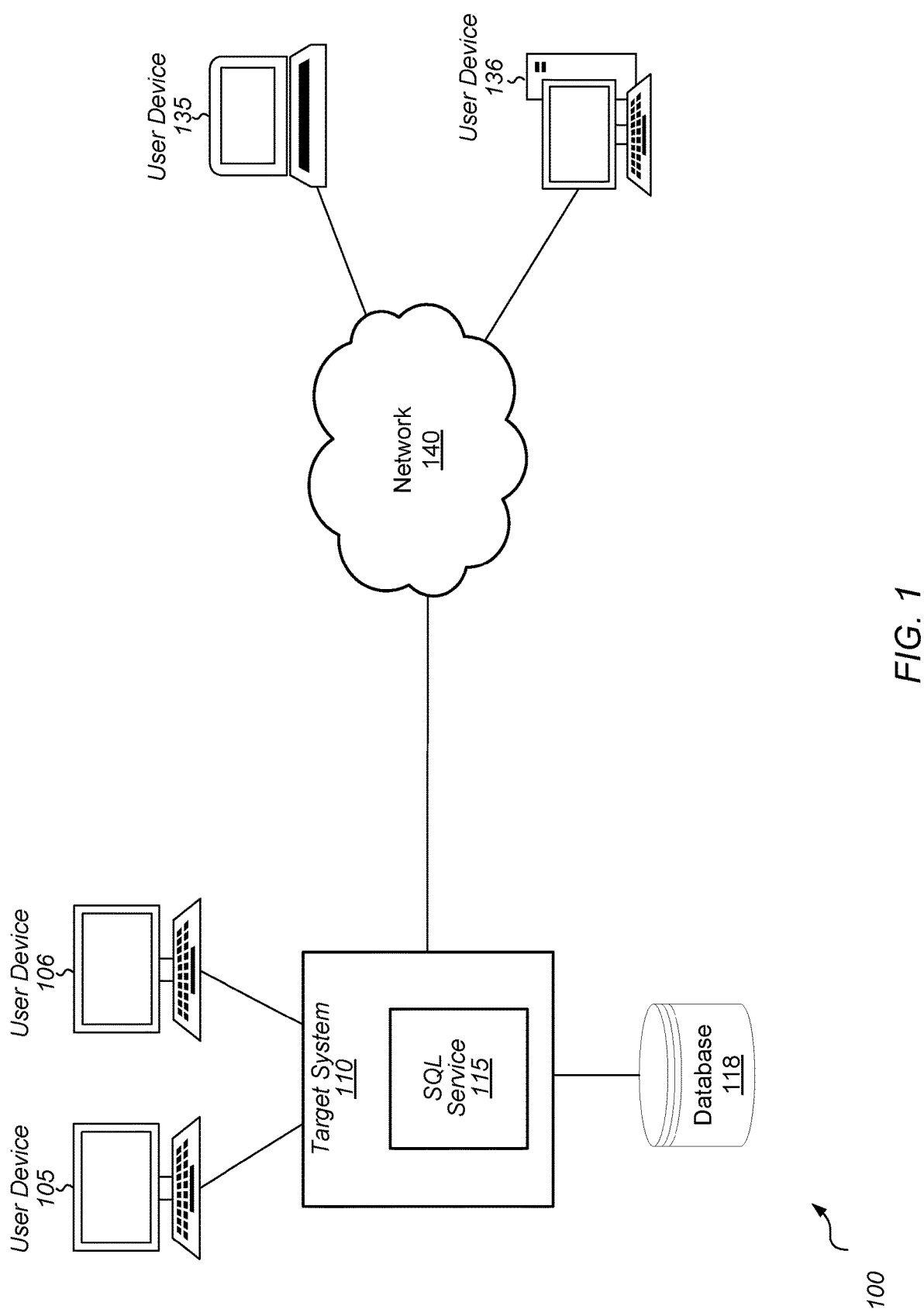
FIG. 1 illustrates a block diagram of a system that includes a target system running a service, and user systems, according to some embodiments.

Blind injection attacks may be used in a variety of situations, including SQL injection attacks, XML, LDAP, and operating system (OS) command injection attacks. In general, such attacks may allow a user to gain unauthorized access to data and/or make unauthorized modifications to data by adding, changing, or deleting data. Blind injection attacks represent security risks in a variety of different scenarios. By mitigating blind injection attacks, computer systems and associated data can be made more secure against unauthorized intrusions.

Structured query language (SQL) databases are some of the most commonly used databases in the world. Countless systems maintains SQL databases for innumerable different purposes. These databases can be used to provide web services, in many instances.

SQL databases can be vulnerable to certain attacks, however. One type of attack is known as SQL injection. In an SQL injection attack, a user may attempt to access restricted data that he does not have privileges for by causing the SQL database to execute rogue SQL code provided by the user. Any database input mechanisms that are not properly sanitized, for example, have the potential to be attacked via SQL injection. This may occur via a web query over HTTP, for example, or may occur from any other type of connection to a database (such as a local connection on a machine or a networked connection from a computer on an intranet or extranet). Thus, SQL injection has the ability to add, delete, or modify data in a database. SQL injection also has the ability to extract data from a database.

In some cases, information from an SQL injection attack may be displayed to a user on a web page. For example, if an SQL error is thrown by the database and the error message includes data extracted from the database, an unauthorized user can get information via the error message mechanism itself. To prevent this flow of information, SQL error mechanisms can be modified so that a user does not see the full error message—perhaps the user is just shown a simple web page stating that "an error occurred for your request." By hiding or obscuring SQL error messages, a potential path for information leakage from databases is eliminated, in various embodiments.

Even when SQL error messages are obscured, however, data can still be extracted using a timing based blind SQL injection attack. In a timing based blind SQL injection attack, the database can be instructed to perform operations that result in a long wait or a short wait—and the duration of time in a server's response can thus leak information from the database. For example, an SQL statement might be constructed to the effect of "if the first character of 'username' is A, wait 10 seconds, otherwise wait 0.1 seconds". If it takes the database over 10 seconds to respond, it can be inferred that the first character of the 'username' database field is indeed "A". This process can be repeated (e.g., try again for "B", "C", etc.), until the desired data has been extracted by an unauthorized user. Various different timing-based queries can be constructed depending on desired parameters and the data to be extracted.

The present disclosure discusses schemes that can mitigate timing-based blind SQL injection attacks, in various embodiments. For example, non-deterministic delays can be introduced to SQL query returns, particularly in certain higher risk situations (such as SQL databases exposed to the internet via HTTP). By altering timing in SQL responses, timing-based blind SQL injection attacks can be mitigated.

Other types of blind injection attacks can also be mitigated using the techniques described herein. XML, LDAP, and OS command blind injection attacks also, in various embodiments, can allow a user unauthorized access to data based on conditional timing statements included in respective command statements. Introducing altered timing in these contexts can prevent unauthorized access or at a minimum make such access more difficult to attain.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes a target system 110, network 140, and user devices 105, 106, 135, and 136.

As shown, target system 110 may be any type of computer system that resides behind firewall 120. Target system 110 may be on a corporate intranet, for example, that is at least partially protected from intrusion by a firewall. User devices 105 and 106 are on a same network as target system 110 in the embodiment shown.

Network 140 includes all or a portion of the Internet in various embodiments. User devices 135 and 136 are also connected to network 140. Thus, for example, user device 135 might be a laptop computer in someone's home or a coffee shop, while user device 105 might be a corporate controlled computer inside a corporate intranet. Note that various other networks and/or networking equipment may be present in a number of embodiments, but are not shown in FIG. 1 for simplicity. Additionally, many possible configurations of target system 110 with user devices are contemplated, and the security techniques discussed herein are not limited to only the configuration(s) that are illustrated in the drawings.

Target system 110 includes service 115, and is also connected to a database 118 in various embodiments. In some embodiments, service 115 is an SQL service. Target system 110 may therefore be configured to receive and respond to SQL queries for database 118. Such queries may take a number of different formats in various embodiments. In some instances, a query at target system 110 may be received from a user who may be directly logged into service 115 (e.g., a user of user device 105 who has some sort of authorized credentials to part or all of service 115, such as a corporate employee who may be allowed to access some portions of database 118 but not others). Note, of course, that even someone with authorized credentials can have their account compromised such that an attacker might be able to use their credentials without their permission. In other instances, a query at target system 110 may be received from a user who does not have any special privileges (e.g., a user of user device 135 who only has generic or public-level access privileges, as might be allowed by a web server via which a query is being made).

In various other embodiments, service 115 is an XML (extensible markup language) service, LDAP (lightweight directory access protocol) service, or operating system (OS) command service (e.g. a command shell or other mechanism for executing operating system commands). Thus, service 115 may receive one or more XML, LDAP, or OS commands in various embodiments. For ease of explanation, various blind injection mitigation techniques are described herein with respect to SQL services, however, these techniques are not limited to SQL and are equally applicable in various other contexts.

Figure 2A:
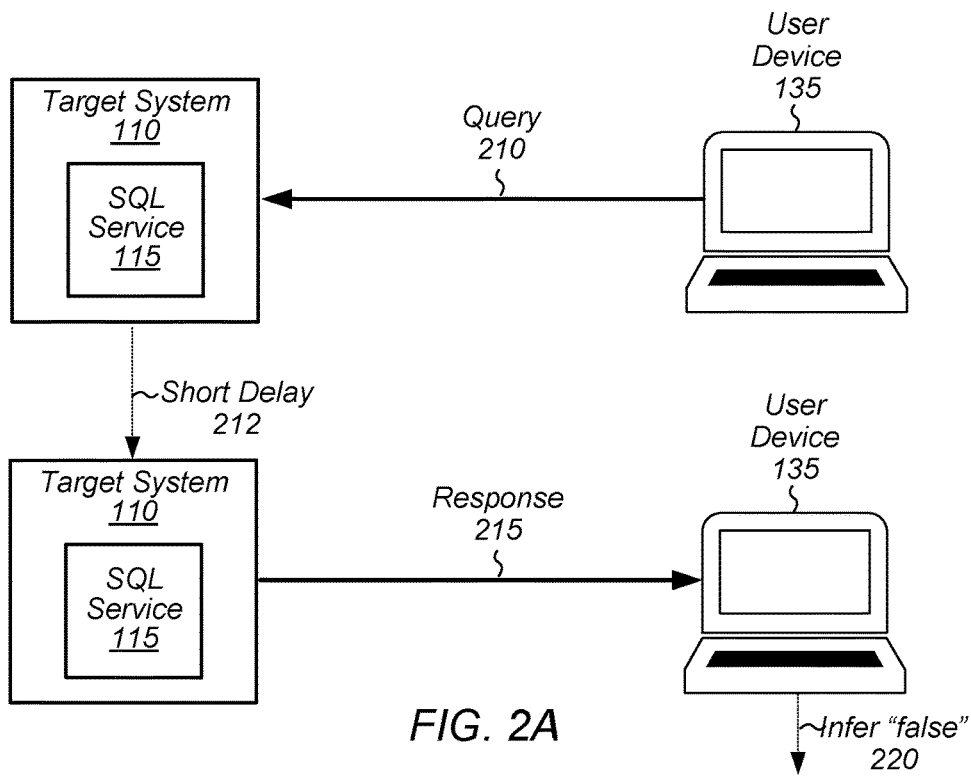
FIGS. 2A and 2B illustrate information flow diagrams related to examples of timing-based blind injection attacks, according to some embodiments.

Turning to FIG. 2A, an information flow diagram is shown illustrating an example of a query response with a short delay, which can relate to a timing-based SQL injection attack. Note that in various embodiments, however, this model is applicable to other blind injection attacks as well (e.g. XML, LDAP, OS command).

In the example shown, user device 135 makes a query 210 to target system 110. This query can be in the form of an HTTP request, in some cases, that causes service 115 to query database 118. Query 210 may also be a direct query (e.g. user device 135 may be directly connected to service 115, using a login account and password). In some embodiments, query 210 may not be an SQL query, but could be an XML-based statement, LDAP query, or an OS command (likewise for query 260). Responses 215 and 265 may therefore be responses to something other than an SQL query in various embodiments.

In the example of FIG. 2A, user device 135 is making a blind SQL injection attack on service 115. Depending on the amount of time taken to respond to query 210, user device 135 (and/or its user) can determine whether a value from database 118 is true or false, for example. Thus, after a short delay 212 occurs, response 215 may indicate that a particular value is false (as indicated by inference 220 made at user device 135).

Figure 2B:
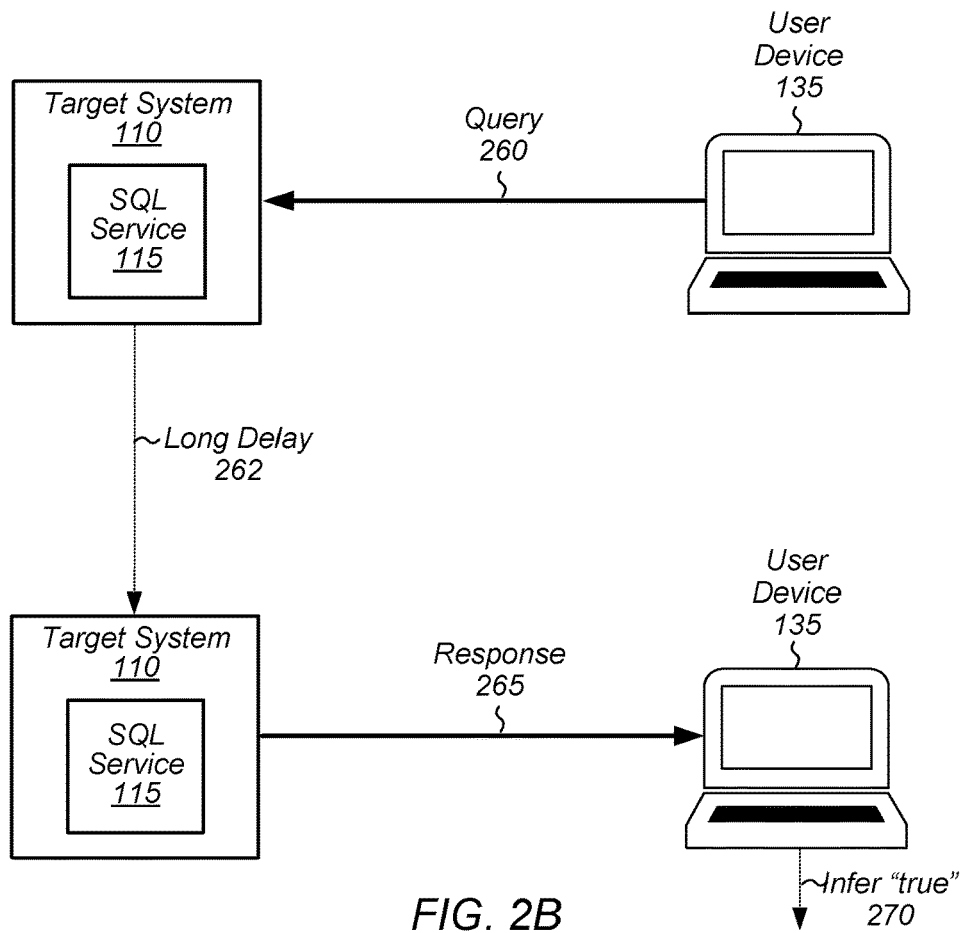

Similarly, a long response can indicate that a particular value is false. For example, an unauthorized user might construct a SQL query 260 to the effect of "If character 3 of the password is 'X', wait 10 seconds, otherwise do nothing". Thus, after a long delay 262 occurs and response 265 is sent, user device 135 (and/or its user) can make inference 270 that a particular value is true. Note generally that many different types of timing-based blind SQL injection attacks are possible, and are not limited to that illustrated by FIGS. 2A and 2B.

Figure 3:
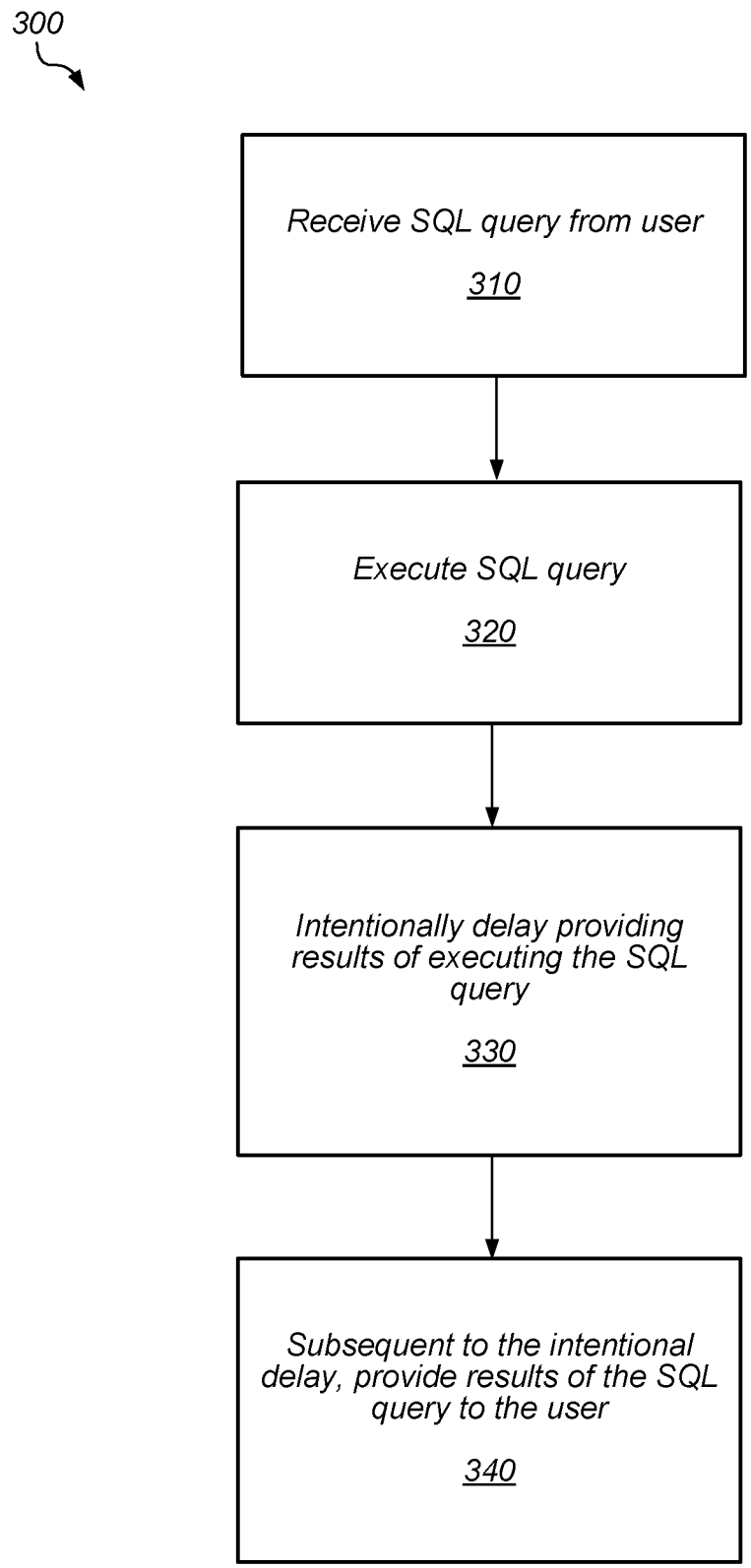
FIG. 3 illustrates a flowchart of a method that relates to mitigating a blind SQL injection attack.

Turning to FIG. 3, a flowchart diagram is shown of one embodiment of a method 300 that relates to mitigating blind SQL injection attacks. Any or all operations described in method 300 may be performed by service 115 on target system 110 in some embodiments, or another process running on any suitable computer system or electronic device in other embodiments. Note that in one or more embodiments, a different process beside service 115 may perform one or more operations of method 300 (e.g., operations described below could be integrated into an SQL service, or as part of a separate program, for example). For ease of explanation, however, operations described below will simply refer to target system 110.

In operation 310, target system 110 receives a first SQL query from a user in various embodiments. This may be a query received directly via a user logged into service 115 (e.g. via a web application, which may or may not have an associated username and/or password with particular security credentials). The query may also be received from a user who is anonymous and/or does not have particular security credentials, such as a remote user of a public-facing website that has uses a SQL database as part of its operations. Accordingly, in some embodiments, operation 310 includes receiving an HTTP request made by a remote computer system. In some cases, an HTTP request may be received by a web server, which then generates an SQL request based on parameters in the HTTP request.

In operation 320, target system 110 executes a first SQL query (e.g. received in operation 310) against an SQL database such as database 118 in various embodiments. Executing the first SQL query may include evaluating one or more SQL statements, retrieving data from one or more tables, modifying data, creating one or more new tables, etc. Executing the SQL query may include taking various programmatic actions unrelated to data retrieval and modification as well. For example, a user may insert a conditional "wait" statement into an SQL query as part of a timing-based blind SQL injection attack.

In operation 330, target system 110 intentionally delays providing results of executing the SQL query by a non-deterministic amount of time, prior to providing the results, in various embodiments. This intentional delay can be calculated using a randomization function in many instances. One implementation might simply insert a random delay between 1 and 10 seconds before a query is responded to, for example (other time periods are possible and contemplated, however). In another embodiment, intentional delay can be based on one or more statements contained within the SQL query. For example, if the query has an embedded conditional "wait" statement (e.g., wait 5 seconds if variable A has value 123), this wait time can be parsed, in some embodiments, from the query. In this case, the query may be identified as a possible attack, and the response could be intentionally delayed by the amount of time indicated by the conditional wait statement. In other words, if a conditional wait statement is detected in the SQL query, the response could be delayed regardless of the outcome of the condition. Thus, if an attacker inserts a delay into an SQL injection, he may never receive an accurate leak of information from the database.

Thus, in some cases, operation 330 includes parsing, from the first SQL query, a particular amount of time that is a conditional delay in the first SQL query, and delaying a response by at least that particular amount of time. This can include, in one embodiment, determining that one or more of a predetermined group of programming statements are present within a particular grammar within the first SQL query. For example, some SQL servers may use the command "waitfor delay XYZ" where XZY is an amount of time. Others may use other time-consuming operations, such as BENCHMARK, SLEEP, WAIT FOR TIME, etc. These time-consuming operations can be located within SQL queries and handled accordingly by ascertaining the parameters of the resulting wait for the command (e.g. number of repetitions of a loop or command, specified time period, etc.). A particular grammar (e.g. regular expression checking) can be used to determine if particular SQL statements represent a delay or not. The grammar can include certain words/commands as well as parameter checking to see if certain SQL is a delay (and thus simply having the word "WAIT" as part of an SQL table name, for example, wouldn't trigger the grammar checker in various embodiments).

Therefore, once an amount of delay from an SQL query is determined, it can be used as part of the intentional delay process. If a 5 second conditional delay is noted in a query, an intentional delay of 5-10, or 5-20, or some other number of seconds could be added regardless of how the query executes. In some instances, the delay would only be intentionally added in the event that the SQL query does NOT result in the delay (e.g., if the conditional delay in the user's query only occurs when A==TRUE, then an intentional delay of related length might only be inserted when A==FALSE, for the other branch of the query). In some cases, the length of non-deterministic delay could be precisely the same length of delay as would have occurred had the conditional delay statement been executed. That is, if an SQL query includes a conditional delay, the query could be restructured so that the same amount of delay will be experienced regardless of how the condition evaluates. This would essentially turn a conditional delay into an unconditional delay, in various instances. In various embodiments, intentionally delaying a response to an SQL query therefore includes using a length of delay in the SQL query as a basis for determining a length of the non-deterministic amount of time.

Delays can also be instituted for other contexts as well, including XML, LDAP, or OS command injection attacks. Commands that may allow for a blind injection attack using one of these mechanisms can be examined to see if they have a conditional delay, for example, and then delayed regardless (e.g. to avoid leaking information). XML, LDAP, or OS commands may be delayed based on an amount of time indicated by their internal structure (e.g. if a WAIT statement is present, it can be parsed according to particular grammar, etc.). The amount of time for delay can also have a random basis. In other words, any of the techniques described relative to a blind SQL injection attack can also be used as applicable in other contexts such as XML, LDAP, or OS commands.

In operation 340, subsequent to the intentional delay, target system 110 provides results of the SQL query to the user. Providing the results may be done through any mechanism, such as via a data stream output on a local terminal, or via a web page that is served to a user that has made a request. In some cases, the web page may be an error message (e.g., the user may try an SQL injection attack that results in an error message, and thus, the results from the SQL query may be delivered as a web page that indicates an error was experienced). Again, in instances where an attacker is attempting to extract information from the SQL database, it may be that the results of the query itself are of no interest to the attacker—only the timing for the response.

Note that blind SQL injection attacks may be possible because a web server was not properly set up to sanitize its inputs. Thus, implementing security checks on the back end (e.g. within service 115 itself or an associated program) can provide a backstop of security even when an initial layer of security fails. An attacker seeking to access unauthorized information via a web query or local query can be thwarted using the techniques described herein, in various embodiments.

Computer-Readable Medium

Figure 4:
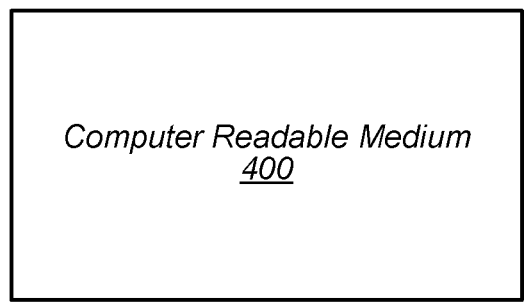
FIG. 4 is a block diagram of one embodiment of a computer readable medium.

Turning briefly to FIG. 4, a block diagram of one embodiment of a computer-readable medium 400 is shown. This computer-readable medium may store instructions corresponding to the operations of FIG. 3 and/or any techniques described herein. Thus, in one embodiment, instructions corresponding to operations performed by target system 110 may be stored on computer-readable medium 400.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VB Script. Note that as used herein, the term "computer-readable medium" refers to a non-transitory computer readable medium.

Computer System

Figure 5:
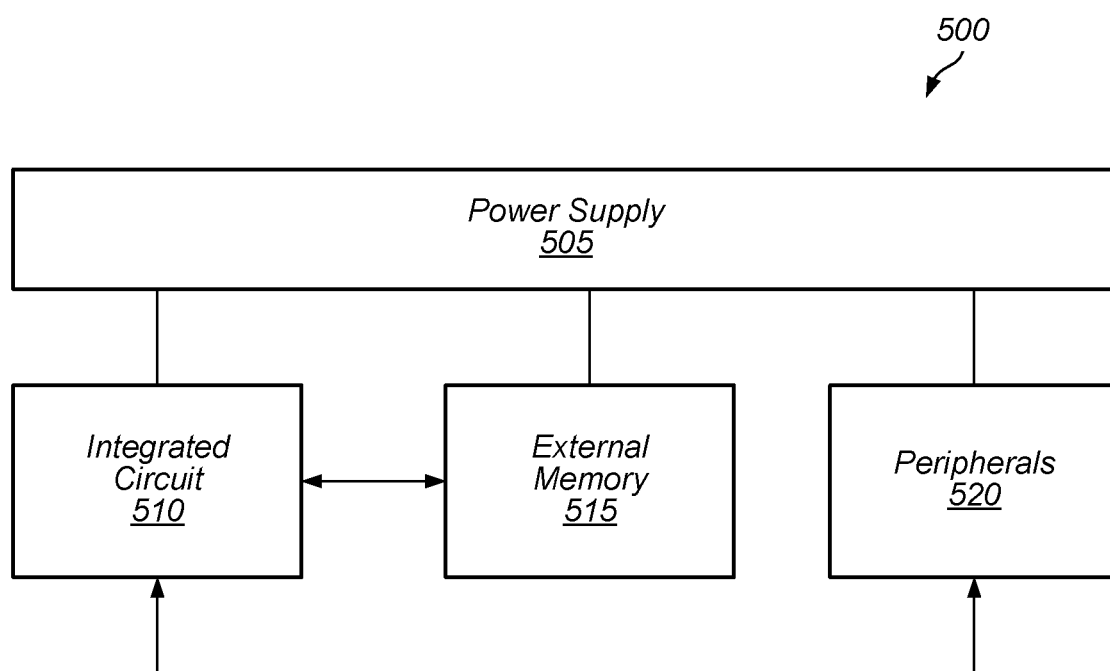
FIG. 5 is a block diagram of one embodiment of a system.

In FIG. 5, one embodiment of a computer system 500 is illustrated. Various embodiments of this system may be target system 110, user device 105 or 135, or any other computer system as discussed above and herein.

In the illustrated embodiment, system 500 includes at least one instance of an integrated circuit (processor) 510 coupled to an external memory 515. The external memory 515 may form a main memory subsystem in one embodiment. The integrated circuit 510 is coupled to one or more peripherals 520 and the external memory 515. A power supply 505 is also provided which supplies one or more supply voltages to the integrated circuit 510 as well as one or more supply voltages to the memory 515 and/or the peripherals 520. In some embodiments, more than one instance of the integrated circuit 510 may be included (and more than one external memory 515 may be included as well).

The memory 515 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 510 in a chip-on-chip configuration, a package-on-package configuration, or a multi-chip module configuration.

The peripherals 520 may include any desired circuitry, depending on the type of system 500. For example, in one embodiment, the system 500 may be a mobile device (e.g. personal digital assistant (PDA), smart phone, etc.) and the peripherals 520 may include devices for various types of wireless communication, such as wife, Bluetooth, cellular, global positioning system, etc. Peripherals 520 may include one or more network access cards. The peripherals 520 may also include additional storage, including RAM storage, solid state storage, or disk storage. The peripherals 520 may include user interface devices such as a display screen, including touch display screens or multitouch display screens, keyboard or other input devices, microphones, speakers, etc. In other embodiments, the system 500 may be any type of computing system (e.g. desktop personal computer, server, laptop, workstation, net top etc.). Peripherals 520 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method relating to mitigating blind SQL injection attacks, comprising:
   receiving, at a computer system running a structured query language (SQL) database service, a first SQL query from a user;
   executing the first SQL query against an SQL database;
   prior to providing results of the executing:
      determining a plurality of programming statements used by the SQL database service for time delay operations requested via SQL queries processed by the computer system;
      determining, using a regular expression checker, that the first SQL query includes one of the plurality of programming statements;
      determining that the first SQL query contains a conditional delay statement based on the one of the plurality of programming statements; and
      in response to the determining that the first SQL query contains the conditional delay statement, determining a first length of delay of a conditional delay in the conditional delay statement;
      determining a second length of delay comprising a non-deterministic amount of time for an intentional delay;
      delaying the providing of the results by the first length of delay and the second length of delay regardless of whether a condition for delay in the conditional delay statement is met; and
   subsequent to delaying by the non-deterministic amount of time, providing, by the computer system, the results of the first SQL query to the user.

2. The method of claim 1, wherein the computer system comprises a web server, and wherein the SQL query is received via a hypertext transfer protocol (HTTPS) request.

3. The method of claim 1, wherein the results of the first SQL query specify an error message indicating the first SQL query was not successfully executed.

4. The method of claim 1, further comprising using a random number generation function to determine a length of the non-deterministic amount of time.

5. The method of claim 1, further comprising using the first length of delay in the first SQL query as a basis for the determining the second length of delay for the non-deterministic amount of time.

6. The method of claim 1, wherein the determining the first length of delay comprises parsing, from the first SQL query, the first length of delay from the conditional delay corresponding to the conditional delay statement in the first SQL query, wherein the non-deterministic amount of time is the first length of delay.

7. The method of claim 1, wherein the determining the first SQL query includes one of the plurality of programming statements comprises parsing a particular grammar within the first SQL query to identify the one of the plurality of programming statements.

8. The method of claim 1, further comprising evaluating the results of a condition in the first SQL query before delaying the providing of the results.

9. The method of claim 1, wherein the SQL query is received via a user account of the computer system that is currently logged into the computer system via one or more security credentials associated with the user account.

10. The method of claim 1, further comprising:
   receiving a second SQL query from another user; and
   based on determining that the second SQL query does not include the conditional delay statement, providing results for the second SQL query without an intentional delay.

11. A non-transitory computer-readable medium having instructions stored thereon that are executable by a computer system to cause the computer system to perform operations comprising:
   receiving, at a structured query language (SQL) database service, a first SQL query from a user;
   executing the first SQL query against an SQL database;
   prior to providing results of the executing:
      determining a plurality of programming statements used by the SQL database service for time delay operations requested via SQL queries processed by the computer system;

determining, using a regular expression checker, that the first SQL query includes one of the plurality of programming statements;

determining that the first SQL query contains a conditional delay statement based on the one of the plurality of programming statements; and in response to the determining that the first SQL query contains the conditional delay statement, determining a first length of delay of a conditional delay in the conditional delay statement;

determining a second length of delay comprising a non-deterministic amount of time for an intentional delay;

delaying the providing of the results by the first length of delay and the second length of delay regardless of whether a condition for delay in the conditional delay statement is met; and subsequent to delaying by the non-deterministic amount of time, providing the results of the first SQL query to the user.

12. The non-transitory computer-readable medium of claim 11, wherein the operations further comprise:

receiving a second SQL query from another user; and based on determining that the second SQL query does not include the conditional delay statement, providing results for the second SQL query without an intentional delay.

13. The non-transitory computer-readable medium of claim 11, wherein the results of the first SQL query specify an error message indicating the first SQL query was not successfully executed.

14. The non-transitory computer-readable medium of claim 11, wherein the operations further comprise using a random number generation function to determine a length of the non-deterministic amount of time.

15. The non-transitory computer-readable medium of claim 11, wherein the operations further comprise using the first length of delay in the first SQL query as a basis for the determining the second length of delay of the non-deterministic amount of time.

16. A computer system, comprising:

a processor; and a non-transitory computer-readable storage medium having instructions stored thereon that are executable by the processor to cause the computer system to perform operations comprising:

receiving, at a structured query language (SQL) database service, a first SQL query from a user;

executing the first SQL query against an SQL database;

prior to providing results of the executing:

determining a plurality of programming statements used by the SQL database service for time delay operations requested via SQL queries processed by the computer system;

determining, using a regular expression checker, that the first SQL query includes one of the plurality of programming statements;

determining that the first SQL query contains a conditional delay statement based on the one of the plurality of programming statements; and in response to the determining that the first SQL query contains the conditional delay statement, determining a first length of delay of a conditional delay in the conditional delay statement;

determining a second length of delay comprising a non-deterministic amount of time for an intentional delay;

delaying the providing of the results by the first length of delay and the second length of delay regardless of whether a condition for delay in the conditional delay statement is met; and subsequent to delaying by the non-deterministic amount of time, providing the results of the first SQL query to the user.

17. The computer system of claim 16, further comprising a plurality of server systems, at least one of which is configured to operate as a web server.

18. The computer system of claim 16, wherein the operations further comprise using a random number generation function to determine a length of the non-deterministic amount of time.

19. The computer system of claim 16, wherein the operations further comprise using the first length of delay in the first SQL query as a basis for the determining the second length of delay of the non-deterministic amount of time.

20. The computer system of claim 19, wherein the results are delayed by the second length of delay determining from the first length of delay indicated by the conditional delay.

* * * * *